UNITED STATES PATENT OFFICE.

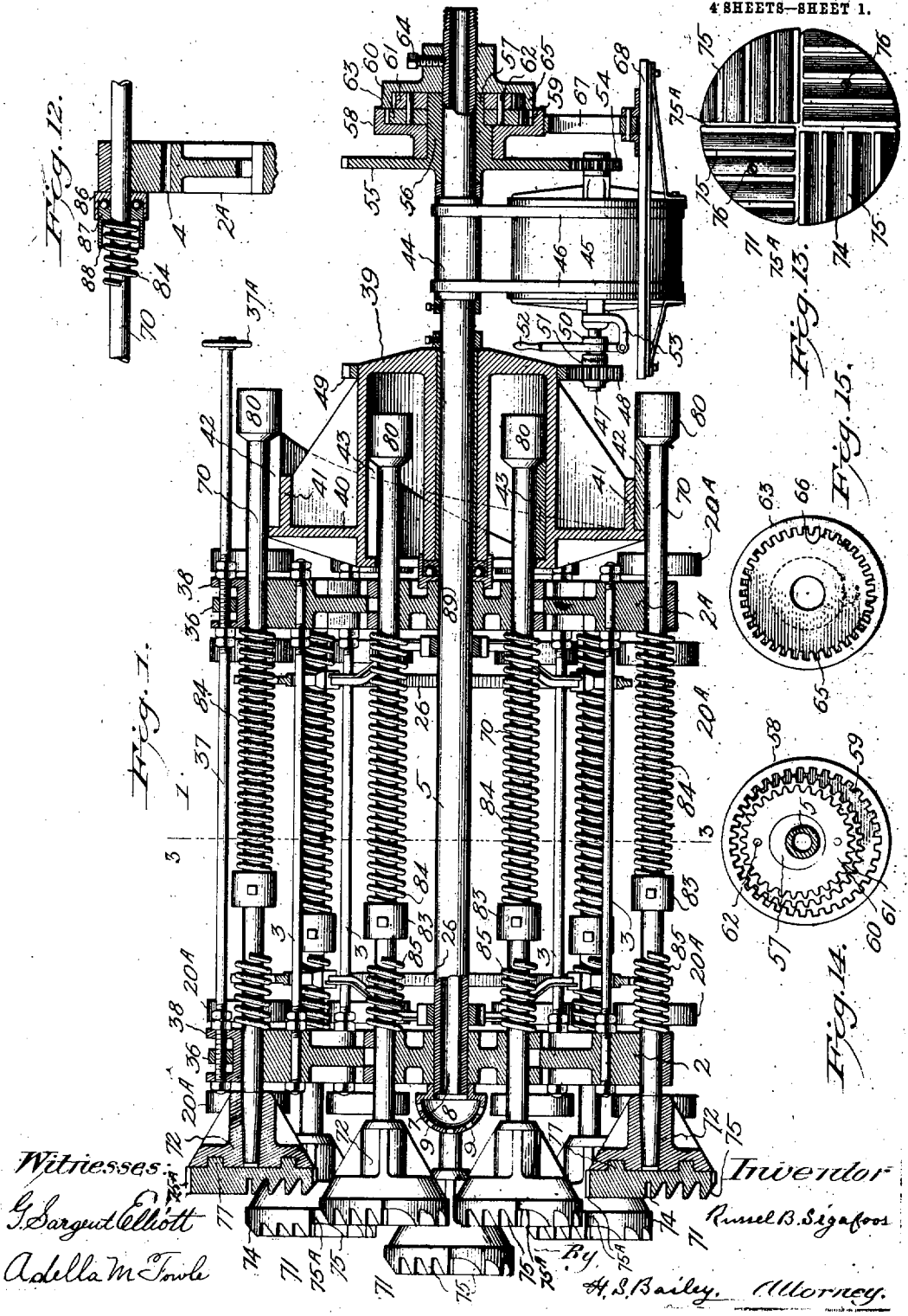

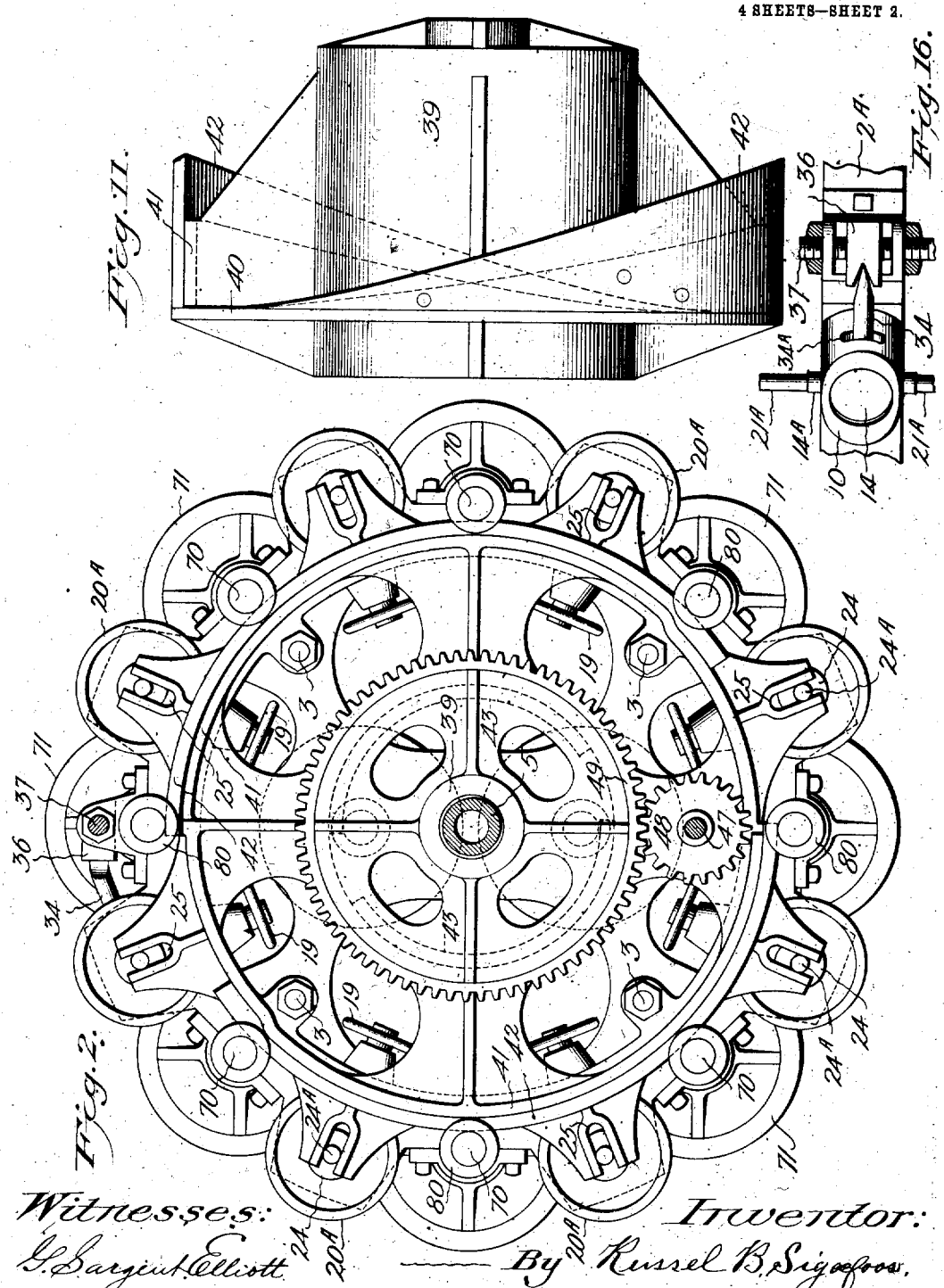

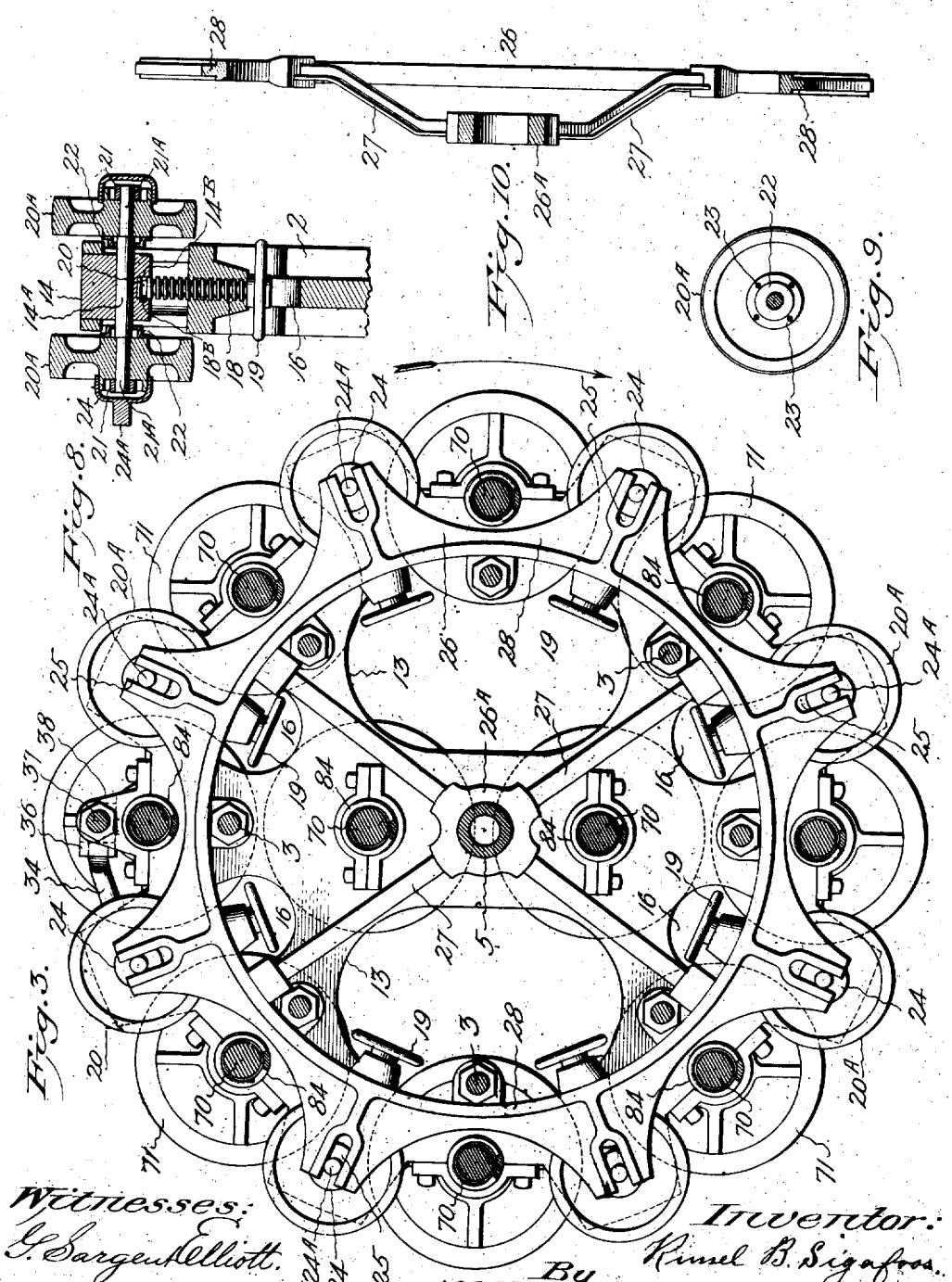

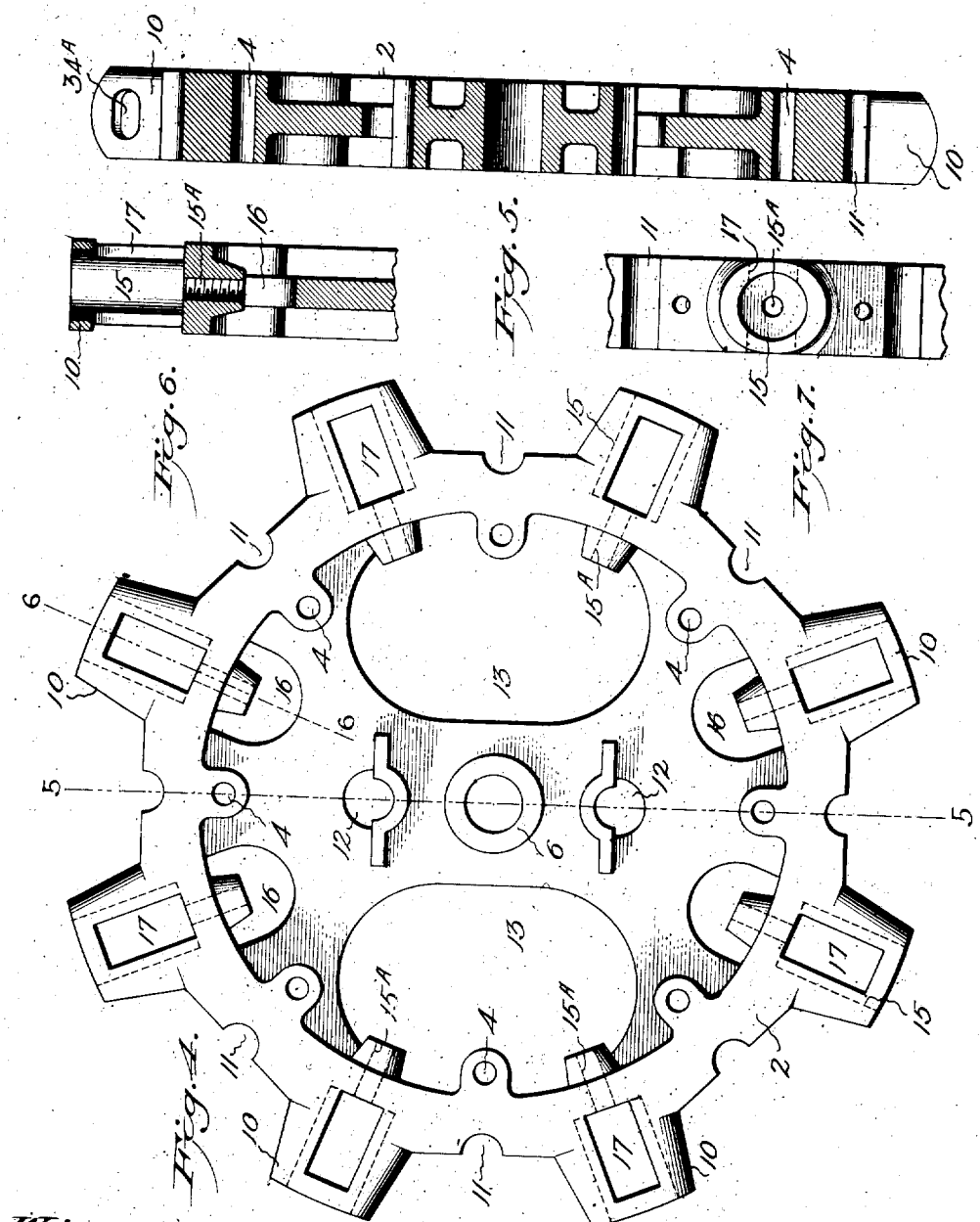

RUSSEL B. SIGAFOOS, OF DENVER, COLORADO.

ROTARY TUNNELING-MACHINE.

No. 901,392.

Specification of Letters Patent.

Patented Oct. 20, 1908.

Application filed May 15, 1907. Serial No. 373,856.

*To all whom it may concern:*

Be it known that I, RUSSEL B. SIGAFOOS, a citizen of the United States of America, residing in the city and county of Denver and State of Colorado, have invented a new and useful Rotary Tunneling-Machine, of which the following is a specification.

My invention relates to improvements in tunneling machines, and the objects of my invention are: first, to provide a rotary tunnel machine adapted to automatically feed into the breast of a tunnel as fast as it cuts into rock, and to automatically feed forward and backward. Second, to provide a rotary tunnel machine with a plurality of reciprocating cutter heads, provided with a plurality of independent rock-cutting lips. Third, to provide a rotary tunnel machine provided with a plurality of reciprocating rotary cutter heads adapted to strike spirally twisting blows. Fourth, to provide a rotary tunnel cutting machine adapted to discharge jets of water throughout the circumference of its rock cutting area. Fifth, to provide a rotary tunnel machine provided with a plurality of independent rotating and spirally striking cutter heads arranged and adapted to permit any one or predetermined number of said cutter heads to be adjusted to strike blows of differential force. Sixth, to provide a rotary tunnel cutting machine provided with an automatic adjustable feeding mechanism that will feed the machine forward in any predetermined curved path, as it cuts its way into rock. And seventh, to provide a thoroughly practical, reliable, operating, and durable rock tunnel cutting machine that requires but little power to operate it, and that is adapted to all characters of railroad, mine, canal, and irrigation ditch rock tunnel work. I attain these objects by the mechanism illustrated in the accompanying drawings, in which:

Figure 1, is a vertical, longitudinal sectional view of a tunneling machine, embodying my invention. Fig. 2, is a front end elevation of the machine, the rotating mechanism being omitted. Fig. 3, is a transverse vertical sectional view of the machine, on the line 3—3 of Fig. 1. Fig. 4, is an elevation of one of the members or flanges constituting one of the ends of the supporting frame of the machine. Fig. 5, is a vertical sectional view of the same, on the line 5—5 of Fig. 4. Fig. 6, is a sectional view of a portion of the flange, on the line 6—6 of Fig. 4. Fig. 7, is a plan view of a portion of the flange illustrated in Fig. 4. Fig. 8, is a view similar to Fig. 6, showing the frame supporting and moving wheels, and the manner of adjusting them. Fig. 9, is an elevation of one of the wheels, showing a dust cap arranged thereon. Fig. 10, is a sectional view of one of the spiders by which the supporting and moving wheels are turned at an angle to the axis of the machine. Fig. 11, is a side view of the drum which carries the cutter head operating cams. Fig. 12, is a fragmental view, showing a ball bearing cap, which receives the rear end of the spring which throws the cutter head stem. Fig. 13, is a front elevation of one of the cutter heads. Figs. 14 and 15, are views of the arrangement of gearing by which the cam drum and frame are rotated, and Fig. 16, is a plan view of a portion of one of the flanges, showing the manner in which the wheel-supporting blocks are turned on their axis.

Similar letters of reference refer to similar parts throughout the views.

Referring to the drawings, the numeral 1 designates the supporting frame of my rotary tunneling machine. This frame 1, consists of two disk flanges 2 and 2$^A$. The flange 2 I term the front or head end flange of the frame 1, and the flange 2$^A$, I term the rear or back end flange of the frame 1. These supporting flanges are disk-shaped and are positioned several feet apart and are rigidly secured together by a circumferential row of clamping bolts, 3, which are spaced at equal distances apart near the periphery of the flanges and are provided with threaded ends that extend through apertures 4, which are arranged in alinement with each other through the flanges, and the ends of the bolts are provided with clamping nuts which are placed on each side of the flanges, and are screwed up to clamp the flanges rigidly between them, and thus securely bolt the flanges in parallel alinement with each other. Theses two flanges, are also mounted on a center driving shaft 5, to which they are secured by any suitable means, and they are provided with shaft boxes 6, which are cast integral with the flanges. This center shaft 5, is hollow and forms a water conveying pipe for providing a supply of water to the rock cutting end of the tunneling machine, as will be explained more fully hereinafter. The center shaft 5, projects through the head end flange 2, a short distance, and to the front end 7 of the shaft 5, I secure a water jet discharging convex shaped nozzle 8, which is provided with a plurality of water jet discharging holes 9, that are arranged through its shell in radial alinement with its center throughout its convex surface so as to discharge jets of water in a circle throughout the area of the circular breast of a tunnel of the size the machine will drill or cut. The opposite end of this shaft 5 extends through and beyond the rear end supporting flange 2ᴬ. The peripheries of these supporting flanges are provided with a plurality of lugs or hubs 10, which are spaced at equal distances apart throughout the circumference of the flanges, and intermediate of each pair of hubs 10 a capped journal box 11, is formed. These capped journal boxes 11, are also spaced at equal distances apart throughout the circumference of the flanges. I preferably illustrate eight of these projecting hubs and eight journal boxes arranged in alternate order, although any desired number may be used. These two supporting flanges 2 and 2ᴬ, are arranged on the center shaft 5, so that the centers of the journal boxes 11 of each flange and also so that the centers of the hubs 10 of the two flanges will be in axial alinement.

I also form on the two frame flanges 2 and 2ᴬ on opposite sides of the shaft boxes 6, additional capped journal boxes 12, which are positioned on each flange on diametrically opposite sides of the shaft box 6, and at equal distances from it, and I arrange these boxes 12, in axial alinement with each other, from one flange to the other. Through the web portions of each of these supporting flanges 2 and 2ᴬ, at right angles to the plane of the three center shaft boxes 6 and 12, and on opposite sides of the axial center of the flanges, I form apertures 13, which are positioned in alinement with each other from one flange to the other and are made large enough to permit an operator to easily crawl through them from one end of the machine to the other. Each projecting hub 10 is provided with an adjustable, slidable, and rotatable block 14, provided with trunnion shafts 14ᴬ, and each hub is provided with a radial bore 15, at the bottom of which is a threaded aperture 15ᴬ, which extends into an aperture 16, formed transversely through the web of each frame, below the hubs.

The radial bores 15, are adapted to receive the blocks 14, and are intersected by transverse apertures 17, in each hub of each flange, which extend entirely through the hubs, and from the bottom of said bores 15, towards the outer ends of the hubs far enough to receive loosely the transversely arranged trunnions 14ᴬ, and permit them to swing with a slight rotative movement with the block 14. The threaded hole 15ᴬ in each of the hubs receives a threaded stem 18, the inner ends of which project into the apertures 16, and may be squared or otherwise formed to receive a wrench, although I preferably provide them with hand wheels 19. The opposite or outer ends of the threaded stems 18 fit loosely and rotatably into apertures 14ᴮ, formed in the inner end of the blocks 14. These blocks 14, I term the foot or tread wheel supporting blocks, and I preferably secure the outer ends of the threaded stems 18 to the aperture 14ᴮ of the blocks 14 against accidental displacement by means of pins 18ᴮ, which are extended through the block and pass through and engage a circumferential recess 20, formed in the end of the stem. The trunnion shafts 14ᴬ, of each foot block 14 project laterally through each block and through and beyond the transverse apertures 17 of each hub.

Upon the trunnion shafts of each adjustable foot block, I rotatably mount a pair of wheels 20ᴬ, which I term tread foot wheels, as they rest on the floor of and are adapted to bear against the circular walls of the tunnel and support the frame 1 rotatably and feed it and the tunneling machine into the rock as fast as the machine drills or cuts its way into it, and they also feed the tunneling machine back and forth in the tunnel to and from the breast of the tunnel, as will be more fully described hereinafter. These foot or tread wheels are secured on the trunnions in any suitable manner, but preferably by being bolted by nuts 21 against reduced and shouldered portions 21ᴬ, formed on the ends of the trunnion shafts. Each of these foot wheels is provided on its side adjacent to its supporting hub with a packing holding cap 22, which is mounted revolubly on the trunnion shaft and is secured to the foot wheel by cap screws 23, or any other suitable means; and to the outside of each foot wheel an axial hub portion is formed and a cap 24 is placed over the end of the trunnion and its nut and is threaded or otherwise secured to the hub portion of the foot wheel. The packing cap is provided with any suitable oil retaining packing and the bearing of each foot wheel is thus incased and is kept well oiled and free from dust and grit by these caps 22 and 24.

The caps 24 are provided with short axial projecting trunnions 24ᴬ, which lie within U-shaped recesses 25, which are formed in the felly or web portion of a pair of spider flanges 26, having hubs 26ᴬ, which are loosely mounted on the center shaft at the side of the supporting flanges, and from which a plurality of spokes 27, radiate to the felly or web portion 28, in which the yoke or U-shaped recesses 25, are formed. Thus when the spider flanges 26, are turned in a manner, and for a purpose to be presently set forth, the foot wheels will be turned at an angle to the axis of the machine.

One of the foot wheel supporting blocks of one of the hubs of each flange is provided with an arm 34, which extends from the block loosely through an aperture 34^A formed through one end of the hub in which the block is housed, and its free end is tapered, and extends into a V-shaped recess in the adjacent end of a follower block 36, which is threaded to a shaft 37, that extends from the front flange to and beyond the rear flange. This shaft is rotatably mounted in yokes 38 which are formed on a pair of oppositely arranged caps of the journal bearings 11 of the flanges 2 and 2^A. Between the bearings of these yokes the follower blocks 36 are placed, and are adapted to be moved along the threaded portions of the shaft towards the front or rear end of the machine, as desired, by rotating the shaft. This feeding movement of the blocks 36 along the shaft in either direction swings the arms 34 to either one side or the other of the circumferential center of the flanges 2 and 2^A, which would naturally be their normal position, which movement turns the foot wheels supporting block to which these arms 34 are attached in the bearings of their hubs, also the trunnions of the block, so that they and the foot wheels of these particular foot wheel supporting blocks and their trunnions stand at an oblique angle to the axis of the machine instead of at right angles, as illustrated. And as the inner foot wheels of these particular foot wheel supporting blocks are each journaled in a recess 25 of one of the spiders which stand at the side of the flanges 2 and 2^A, when these particular wheels are moved or swung around to stand pointing towards the head of the machine or towards its rear end, the spiders are also rotated either ahead or backward on the center shaft, and this rotative movement of the spiders turns all of the wheels of each flange, as the arms of the spiders are connected to one end of each pair of wheels.

The supporting frame is adapted to be rotated preferably towards the right or in the direction of the arrow, consequently when the shaft 37 is rotated to turn the arms 34 towards the front or head end of the machine, the wheel supporting blocks and their trunnions and the foot wheels are all turned in that direction also. Then when the supporting frame is rotated in the direction of the arrow, the tunneling machine will feed ahead, and against the breast of the tunnel it is drilling, and if these wheels are turned to point towards the rear end of the machine by turning the shaft 37, to move the arms and blocks and their trunnion and the wheels to point towards the rear end of the machine the supporting frame will be rotated in the direction of the arrow, but the tunneling machine will feed backward or away from the breast of the tunnel it is drilling, as will be explained fully hereinafter.

Upon the shaft 5, adjacent to the rear side of the flange head 2^A, is rotatably mounted the hub of a drum 39, which is provided at the end nearest to the flange head 2^A, with a circular flange 40, which has formed adjacent to its circumference and on diametrically opposite sides of its axial center, supporting flanges 41, which extend at right angles to the flange, and are of semi-circular form. The edges of these supporting flanges begin at one end on a level with the flange 40, and gradually widen out to their opposite ends, sufficiently to support a pair of semi-circular cams 42, which increase in width at a greater ratio than the supports 41, so that their wide ends, which terminate with the ends of the said supports are wider than they, and the edges of these cams are beveled as shown in Figs. 1 and 11, for a purpose to be presently explained. To the inner surface of the drum, are secured a similar pair of cams 43, and in each instance there is a slight interval or gap, between the broad end of one cam, and the commencement of the other cam. Adjacent to the rear end of the drum 39, a short sleeve 44, is supported upon the shaft 5, from which is suspended a motor 45, which may be of any preferred type, but is preferably an electric motor, and is suspended from the sleeve 44, by strap iron hangers 46. Upon the forward end of the driving shaft 47 of the motor is loosely mounted a pinion 48, and on the rear end of the cam drum a gear 49 is mounted and secured, which is arranged to mesh with the driving pinion of the motor; consequently the motor rotates the drum. A clutch 50 is mounted on the motor shaft, and is adapted to engage a clutch face 51, on the pinion 48, when it is desired to operate the drum, but when it is not desired to operate the drum, the clutch 50 is disconnected from the pinion 48, by a hand lever 52, one end of which is pivoted to a bracket 53, secured to the motor. Upon the opposite end of the motor shaft is mounted a pinion 54, which meshes with a gear wheel 55, mounted on the shaft 5, the gear 55, being provided with a projecting hub 56, the outer end of which is formed into a bearing which is eccentric to the axis of the hub 56. A casing 58 is mounted on the hub of the gear 55, the rim of which is formed with internal gear teeth 59, and upon the eccentric bearing is mounted a gear wheel 60 of less diameter than the internal diameter of the gear casing 58.

Upon the eccentric at the side of the gear 60, a second gear 61, is rotatably mounted, which is smaller in diameter than the gear 60, and is secured to it by lateral pins 62. On the rear end of the center driving shaft 5, a second casing 63, is mounted and secured thereto by a set screw 64, or other suitable means. This casing is positioned on the driving shaft so as to inclose the gear wheel 61, and also extends to the side of the casing 58. This casing 63, is also provided with a rim 65, the inner periphery of which is provided with gear teeth 66, which are positioned in the rotative plane of and meshes with the gear 61. The casing 58, is held stationary by a bracket 67, which is secured to the casing and to a platform 68, which is secured in any suitable manner to the motor.

The casings 58 and 63 and their gears 60 and 61, coöperating with the eccentric 57, constitute a sun and planet motion gear movement, and the object of it is to transmit the power of the motor to the center driving shaft 5, at a very greatly reduced speed below that imparted to the cam-drum by the motor through the medium of the driving pinion 48 and gear 49.

The power is transmitted as follows: The motor pinion 48 and gear 49 drive the cam-drum 39, and the pinion 54 on the rear end of the motor shaft turns the gear wheel 55, the hub of which revolves within the fixed casing 58. The gear 60, on the eccentric bearing 57, is thus caused to travel around the casing 58, in an eccentric plane, and is thereby given a rotary movement, by the engagement of its teeth with those of the casing, and this rotary motion is also imparted to the gear 61, which is secured to the gear 60, and as the gear 61 revolves eccentrically within the casing 63, and at the same time axially upon its bearing 57, it causes the casing 63, to revolve at a greatly less rate of speed than the gear wheel 55, and assuming that the motor rotates the cam-drum one hundred revolutions per minute, the sun and planet movement gears are proportioned and arranged to reduce this speed so that the driving shaft and the frame rotate one revolution per minute, or one hundred to one. Consequently while the cam-drum is rotating one hundred revolutions per minute, the supporting frame of the machine is being rotated one revolution.

I employ the clutch 50 for locking the gear 48, to the motor shaft in order that should it be desired at any time to stop the rotative movement of the cam drum, and still continue to rotate the frame independently of it, this can be accomplished by disengaging the clutch from the gear 48, when the drum will cease to revolve. This is especially desirable when the machine is being backed out of a tunnel, as at such times, the cams and cutter stems operated thereby, should be inactive, as will be shown hereinafter.

The rotating flanges 2 and 2ᴬ of my tunneling machine are adapted to support in operative tunnel cutting relation a plurality of reciprocating stems 70, in their circumferential row of journal boxes 11, and also in their two inner center boxes 12. These stems 70, extend from one frame to the other and also beyond the frame 2 to the front of the machine, and rearwardly beyond the rear frame 2ᴬ to the cam-drum. The front ends of the stems are provided with cutter-heads 71, which comprise disk portions 72, which are secured to the ends of the stems in any suitable manner preferably by tapering the ends of each stem and fitting the disks on the tapered ends of the stems; and rock-cutting heads 74 which are provided with a plurality of rock cutting lips 75. These cutter disks may be secured to their supporting disks by any suitable means, but I preferably detachably secure them by means of bolts or screws 76, and in order to lock them securely to their supporting disks 72, I provide their rear sides with projecting key lugs 77, which project and fit snugly into sockets in the supporting disks 72.

The rock cutting lips 75, of each cutter head, are arranged in groups, and I preferably place four cutting lips in each group and place four groups on each cutter head, arranging each group to occupy one quarter of the surface of the cutter head and arranging the cutters of the diagonally opposite groups of cutting lips parallel with each other and at right angles to the two opposite groups. These rock cutting lips may be of any desired form or shape practical for cutting or crushing rock, but I preferably make them of triangular form with their points or edges flattened in order that they may be blunt instead of sharp, so that when they strike against rock the blows may crush the rock rather than cut it.

At the periphery of each cutter head the ends of the cutting lips that lie along the opposite diametrical centers of each cutter head and mark the boundaries of each quarter surface of the rock cutting face of the cutter heads, are extended across the peripheral surface of the cutter heads longitudinally with the axis of the cutter head end of the stems and at right angles to the cutting lips on the faces of them, which forms a rock cutting lip 75ᴬ extending entirely across the peripheral surface of each cutter head at each quarter of its circumference, making four of these peripheral rock cutting lips on each cutter head and thirty-two on the eight cutter heads of the circumferential row of cutter heads that define the diameter of tunnel the machine will drill. The object of these peripheral rock cutting lips is to permit the cutter heads to cut and drill the rock at their peripheral edges, as they rotate with their revoluble supporting frame, and also as they rotate on their own axis with the stems, which enables them to cut and maintain the tunnel of the full diameter of the circumferential row of cutter heads without wearing away the peripheral surfaces of the cutter heads; thus obviating any danger of the cutter heads wearing smaller in diameter and of the tunnel growing smaller and smaller as the machine proceeds into the rock. While I have described each cutter head as being provided with but four of these peripheral rock cutting lips as shown at 75$^A$ in Figs. 1 and 13 more may be employed if desired.

The opposite terminal ends of the outer circumferential row of cutter head stems and also of the two interior stems are provided with collars 80, the inner ends of which are beveled to match the bevel of and to bear and rotate against the cam-edges of the interior and exterior cams 42 and 43, of the cam drum 39 which as they rotate with the drum draw the stems backward on the rear strokes of their reciprocal movement. These wedge-shaped cams occupy each about four-fifths of the circumference of the drum, and they terminate in an abrupt shoulder, and when the beveled edges of the collars of the stems run off of them, they are arranged and adapted to be thrown forward and impinged against the rock breast of the tunnel, by any suitable means, two stems being released from the cams at the same time on opposite sides of the drum and supporting frames, while the two inner center stems are also released at the same time, once at each revolution.

My invention contemplates the use of any suitable resilient means for throwing the stems and cutter heads forward when released from the cam, but I preferably carry out this feature of my invention in the following manner:

Upon each stem I secure adjacent to the flange 2 a collar 83, and upon each stem between this collar and the front side of the frame 2$^A$, I place a coiled spring 84. The frame 2$^A$ forms an abutment for one end of each spring 84, and the collar the abutment for the opposite end. And as the cams draw the stems back, these coiled springs are compressed between the collar and the flange 2$^A$, and when the stems escape the cams the springs throw the stems and the cutter heads violently forward. I preferably use springs that are adapted to cause each stem to strike about a four thousand pound blow, and as I employ ten stems and cutter heads in the tunneling machine they strike about eighty thousand pound blows at each revolution of the cam-drum. I have illustrated eight cutter heads and stems in the outside circumferential row and position them within the same radius from the axial center of the driving shaft, and make the cutter heads of such a diameter that they cut a circle a little larger in diameter than the diameters of the flanges 2 and 2$^A$, and its foot wheels. These cutter heads also cut a circumferential ring of such width that but a small center portion is left and the two center cutter heads and stems are arranged in diametrical alinement with two cutter heads of the outer row of cutter heads and they over-lap the cutting path of the outer row of cutter heads and cut this center portion out at the same time the circumferential row of cutter heads are cutting out the greater portion of the circular breast of the tunnel.

In order to cushion the forward stroke of the stem and cutter head in case the cutter head is not within striking relation to the rock breast of the tunnel, I place a short coiled spring 85, on each stem between the collar 83 of the stem and the rear side of the flange 2, which I term the cushioning spring, and which is arranged so that when the cutter heads are in operative striking relation to rock the collars 83 of the stems do not strike them, but if a very soft or hollow seam is encountered by one or more of the cutter heads, their cushion springs will receive and cushion the forward blow of the stem and the cutter head.

It sometimes happens in cutting a tunnel that one part or side or portion of the breast of rock will be very much softer than the other part or side or portion, and if some means were not employed to cushion the blows of the stems and cutter heads as they move over these soft places, they would cut so much deeper into the rock breast that they would soon have a hole cut in the soft part of the tunnel's breast, which would make the breast of the tunnel of a very irregular surface, and would retard the cutting speed of the machine, and render it much more difficult to hold it in proper alinement than when the surface of the breast is kept even throughout. I have, consequently, arranged the stems so that at any desired part of their rotative movement around the breast of the tunnel the normal force of their blows may not only be cushioned, but also in cases where the ground is especially soft, be if desired, lessened. I accomplish this by loosening and moving and resetting the collars 83, along the stems towards the flange 2, which releases the coiled springs of their normal tension and decreases the force of the stroke of the stems and the cutter heads.

The rotative movement of the machine is so slow that these collars can be loosened and their position shifted by an attendant without stopping the machine as a rule, although it may be necessary to slow its normal speed down, and if desired the machine could be stopped as each cutter head arrives at a soft spot and its spring relaxes, and then started up again, and again stopped and the spring of each cutter head could be again re-adjusted to its normal tension at the opposite edge of the soft spot. It is only, however, when an exceptionally soft spot is encountered in the breast of a tunnel that it is necessary to manipulate the collars 83 to lessen the normal blow of the springs in this manner, as the cushioning springs alone would be found sufficient for cushioning the spent or inoperative blows of the stems under normal conditions.

In Fig. 12, I have shown means for facilitating the rotation of the stems 70, and also the springs 84 as they are drawn back by the cams 42, comprising a ball-bearing cup 86, which lies against the front side of the flange 2^A, and through which the stem 70 passes centrally. This cup is supplied with balls, and a washer 87, having a central aperture through which the stem passes, fits within the cup, against the balls, and is formed with a housing 88, in which the end of the spring 84 lies. Thus, the pressure of the spring will be received by the ball bearing, which will allow the stem and also the spring to turn, freely, as the collars 80 roll upon the cams 42, and this rolling or rotary motion of the stems continues after they leave the cams and until they strike the rock and causes them to strike the rock with a spirally twisting blow. A ball bearing 89, is also interposed between the end of the hub of the cam drum 39, and the central bearing hub 6, of the flange 2^A, which will receive the pressure exerted upon the cam drum by the actuating springs of the cutter head stems, and will thus reduce the friction between the drum and flange to a minimum.

The operation of my improved tunneling machine is as follows: The tunneling machine cuts a round tunnel a trifle larger in diameter than the diameter of its frame and its foot wheels, and the tunneling machine lays in and fills the tunnel, resting on its foot wheels, which bear on the curved bottom and sidewalls of the tunnel, and the entire frame rotates and rolls around on these foot wheels, being rotated by the electric motor which is suspended from the shaft 5. This electric motor is connected to a supply of electric current, by suitable wires, and rotates the cam-drum; and the motor pinion 54, and gear wheel 55, drive the sun and planet gear mechanism; which in turn rotates the driving shaft at a very greatly reduced rate of speed to that at which the cam-drum is driven by the motor, preferably at a ratio of about a hundred to one; consequently, the cam-drum is rotated at about one hundred revolutions per minute and in the same time the whole machine makes but one revolution, and at each revolution of the cam-drum each of the cutter-heads and their stems strike two blows apiece, and as there are ten cutter heads and stems and four cams they strike twenty blows per revolution of the cam-drum, and as each cutter head is arranged to strike about a four thousand pound blow the machine strikes against the breast of the tunnel twenty blows per revolution of about four thousand pounds each, or about eighty thousand pounds of blows per revolution which very rapidly drills a tunnel. The beveled shoulders of the stems are held by such a pressure by their forwardly throwing springs 84, that they roll on the beveled edges of the cams, and when they drop off the cams they are under a good rate of rotative speed; consequently, when they strike the breast of the tunnel, they strike a twisting blow that crushes and grinds the rock to a greater degree than a straight blow. During the drilling operation jets of water under pressure are discharged from the numerous jet apertures of the water nozzle 8, throughout the circumference and area of the breast of the tunnel, and during the tunnel drilling operation the machine is fed forward automatically by inclining the foot wheels at a slight oblique forward angle to the longitudinal axis of the driving shaft, by turning the hand wheel 37^A on the rear end of the shaft 37 which movement of the shaft 37, slides the follower blocks 33 towards the front end of the machine, which shifts the arms 34, and thereby turns the blocks 14 to which they are secured, with their foot wheels, and as the trunnion on the dust cap of each pair of wheels lies in one of the recesses 25 of the spider 26, all of the pairs of wheels will be turned simultaneously to point towards the front end of the machine. Then as the machine rotates in the tunnel its foot wheels roll on the surface of the tunnel in a forwardly spiral path and feed the machine forward, and hold it up against the breast of the tunnel, and feed it forward as fast as it drills away the rock.

Whenever it is desired to move the machine backward in the tunnel, away from the breast of the tunnel, the shaft 37 is rotated to reverse the angle of the foot wheels, so that they will stand at an oblique angle towards the rear end of the machine. Then as the machine rotates in the tunnel, its foot wheels will move the machine backward away from the breast of the tunnel, and at such times the clutch 50, is released from the pinion 48, so that the cam drum and cutter heads will remain stationary.

The machine can also be guided to cut the tunnel at any desired upward or downward or lateral angle to a straight horizontal plane, by proper radial adjustment of these foot wheels. Consequently, railroad curves can be accurately cut with it as it progressively cuts a tunnel through a hill or mountain of rock. Thus if it is desired to cut the tunnel at any desired upward grade of feet per one hundred feet, the foot wheels of the rear flange 2ᴀ should be contracted into a smaller circumferential circle than those of the front flange 2, by turning the hand wheels 19, which turn the threaded stems 18, and withdraw the blocks 14, and the wheels carried thereby; and thus the rear end of the machine will lie on a lower plane than the front end, which would incline the machine slightly upward, and then the machine will work into the rock at a slight upward angle, and form a slightly upwardly inclined tunnel.

The degree of inclination of the tunnel would depend on the degree of inclination of the machine, which could be easily adjusted to form a tunnel of any upward grade or pitch desired. In case it is desired to cut a curve in a tunnel, the foot blocks on the side of the machine that corresponds to the outside of the curve, are moved inward by an attendant, and those on the inside corresponding to the inside of the curve, are moved radially outward by an attendant, so as to force the rear end of the machine against the outside of the curve of the tunnel, which will turn the head end of the machine to point to one side of a straight line and cause it to move forward in a curved line. As the radius of the curve would be known by survey of the tunnel, the machine can be readily adjusted by careful manipulation of the foot wheels to move forward to cut the tunnel in the curve desired.

My invention contemplates a rotary tunneling machine adapted to all characters of rock tunnel work, and while I have illustrated and described a tunneling machine embodying the preferred construction and arrangement of my invention, I do not wish to be limited to the construction and arrangement shown, as many changes might be made in it without departing from the spirit of my invention.

Having described my invention, what I claim as new and desire to secure by Letters Patent, is:

1. In a tunneling machine, a supporting frame, and a plurality of independently reciprocating rock drilling heads mounted in said frame, said heads being provided with means including beveled shouldered portions and horizontally positioned cams for rotating said heads on the rock striking strokes of their reciprocal movement whereby they strike twisting blows against the rock breast of tunnels.

2. In a tunneling machine, a rotating frame, a plurality of independent pairs of supporting wheels pivotally mounted on the periphery of said frame, and means for tilting said wheels obliquely to the rotative plane of said frame.

3. In a rotary tunneling machine, a plurality of reciprocating drills, a circular supporting frame in which said drills are reciprocally mounted, circular rows of adjustable foot wheels mounted on said frame and arranged to be moved into angular positions to the longitudinal axis of said machine, means including a motor for rotating said frame and drills, and means including a cam wheel having two concentrically arranged cam surfaces for operatively reciprocating said drills.

4. In a rotary tunneling machine, a plurality of reciprocating rock drilling heads and stems, a rotatable frame arranged to support said heads and stems, a driving shaft mounted on said frame, means including a cam mounted on said driving shaft for reciprocating said heads and stems, and means including a motor supported by said driving shaft for rotating said frame.

5. In a rotary tunneling machine, a plurality of independently reciprocating rock cutting heads and stems, arranged to rotate in a circular path and to cut a circular tunnel, and adapted to operatively drill rock, a wheeled frame arranged to support said rock cutting heads and stems, a driving shaft in the axial center of said frame, a motor supported by said driving shaft, means including said motor for rotatably feeding said frame spirally to and from the breasts of and to operatively drill tunnels.

6. In a rotary tunneling machine, a plurality of rock drilling heads and stems, a rotatable wheeled frame for reciprocally supporting said heads and stems, means including a spring mounted on each stem and a cam mounted on said frame for reciprocating each of said heads and stems to operatively drill rock, a shaft axially mounted in said wheeled frame, a motor supported by and connected to said shaft, means including said motor for rotating said frame, means including a beveled head on said stems for frictionally rotating said stems, and means for adjusting the wheels of said frame for feeding said frame and heads and stems spirally to and from the breasts of and to operatively drill tunnels in rock.

7. In a rotary tunneling machine, a plurality of drills, a frame arranged to support said drills, one or more circumferential rows of supporting foot wheels on the periphery of said frame, means including cams and springs for reciprocating said drills to operatively drill rock, means including a motor for rotating said frame, and means including a rotatable rod for adjustably tilting said foot wheels to feed said frame and drills spirally to and fro in a tunnel and against the breast of a tunnel as fast as said drills will drill the tunnel.

8. In a tunneling machine, a plurality of drilling heads, each of which is provided with a plurality of rock cutting lips, stems horizontally mounted in parallel alinement and arranged to support said drilling heads, a circular frame arranged to support said stems in a substantially horizontal position, means including a cam for reciprocating said stems and drilling heads to operatively drill rock, a plurality of foot wheels on said frame, and means including a spider connected to said frame and wheels for moving said foot wheels synchronously to automatically feed said frame spirally to and from the breast of tunnels.

9. In a rotary tunneling machine, a rotatable frame, means including a motor for rotating said frame, a plurality of individually reciprocating rock drills collectively rotatably mounted in said revoluble frame, circumscribing foot wheels mounted upon the periphery of said frame, means including a threaded rod connected with said foot wheels and frame for adjustably turning said foot wheels to feed said frame and drilling heads forward or backward and in operative drilling relation to the rock breast of a tunnel when said frame is rotated, and means including a cam rotatably mounted on said frame for reciprocating said drills.

10. In a rotary tunneling machine, a plurality of disk shaped circular and horizontally arranged and independently reciprocating rock drills, a cylindrical shaped frame in which said drills are supported in a circular row and are arranged and adapted to drill a circular tunnel of larger diameter than said supporting frame, means attached to said frame and including a plurality of circumscribing foot wheels pivotally mounted on said frame for reciprocally feeding said drills and frame to operatively drill tunnels in rock, means including a motor for rotating said frame, cams rotatably supported by said drill's rotative supporting frame, means including gearing connected with said motor for rotating said cams independent of the rotative movement of said drill supporting frame, means including a head on said drills arranged to engage said cams and impart a frictional rotative movement to said drills and at the same time to move said drills on the rearward stroke of their reciprocal movement, and an expansive spring connected to each drill and arranged to actuate said drills to operatively drill rock on the rock impinging stroke of their reciprocal movements.

11. In a rotary tunneling machine, a revoluble frame, a circularly arranged group of drills reciprocally mounted in said frame, a plurality of foot wheels pivotally mounted on said frame and encircling the same at predetermined distances apart, means for tilting said wheels to the longitudinal axis of said frame for feeding said drills and frame spirally as they rotate in a tunnel forwardly or backwardly as desired, an axial shaft to said frame, a motor supported by said frame, means including gearing connected to said motor for rotating said frame, means including an adjustable movable bearing for said foot wheels for radially adjusting said foot wheels on said frame, a cam-drum rotatably supported on said shaft independent of said frame, means including gearing connected to said motor for rotating said cam-drum independent of said frame and its center shaft, cams on said cam-drum, a beveled shouldered head portion on each drill of said circularly arranged group of drills arranged to engage said cams on the inoperative rock cutting stroke of said drills' reciprocal movement, means including an expansion spring connected to each drill of said group of drills for actuating said drills on the operative rock cutting stroke of their reciprocal movement, when said drills are released by said cams, whereby each of said drills is frictionally rotated during the operative rock drilling stroke of its reciprocal movement, and each drill is caused to strike a spirally twisting blow.

12. A rotary tunneling machine, comprising a revoluble frame, a plurality of pivotally journaled radially adjustable foot wheels encircling said revoluble frame, upon which said frame is adapted to revolubly roll, means connected to said frame for moving said wheels to cause said frame to move longitudinally in a tunnel when rotated, a plurality of drills reciprocally mounted in said frame parallel with its axis and arranged and adapted to cut a circular tunnel of larger diameter than said revoluble frame and its foot wheels, means connected to said revoluble frame for reciprocating said drills in any predetermined order to operatively drill the breast of a rock tunnel, and means connected to said revoluble frame and including a motor for rotating said frame in a tunnel, and means connected to said motor and including gearing for actuating said drills to operatively drill rock.

13. In a rotary tunneling machine, the combination with a suitable revoluble rolling frame, of a plurality of radially adjustable pivotally journaled foot wheels, positioned at predetermined points of said frame's circumference, and means connected to said frame for synchronously moving said foot wheels to cause said frame to move longitudinally on the floor of a tunnel when rotated, a shaft at the center of said frame, and means including a motor for rotating said frame.

14. In a rotary tunneling machine, the combination with a revoluble supporting frame comprising flanges secured to an axial driving shaft, and a circumferential row of rods connecting said flanges together adjacent to their peripheral edges, a circumferential row of radial hubs on the peripheral edges of said flanges, a block slidably mounted radially in each of said hubs and pivotally mounted therein to turn and swing on its radial axis, means including a threaded rod connected to said flanges for adjustably moving one block in each of said flanges, oppositely extending trunnion shafts on said blocks extending through apertures in said hubs, a pair of foot wheels mounted on the trunnions of each of said blocks, spider armed flanges rotatably mounted on said driving shaft having radial bearing recesses; hubs on said wheels which lie in said recesses, whereby the turning of one pair of wheels on each flange will cause all of said pairs of wheels to turn synchronously into any predetermined oblique position relative to the longitudinal axis of said frame's driving shaft's axis, whereby said foot wheels are canted into angular position adapted to cause said revoluble frame as it rotates to roll in a spiral path in a tunnel, means including a motor connected to said driving shaft for rotating said frame and foot wheels, and a plurality of operatively arranged reciprocating rock cutting drills arranged on said frame to drill a tunnel larger in diameter than said frame.

15. In a rotary tunneling machine, the combination with a rotary rolling wheeled frame provided with a group of reciprocating drills arranged to drill a circular shaped tunnel of larger diameter than said frame, of means including foot wheels connected with said frame for rollingly supporting said frame in a tunnel, a plurality of cams connected to said frame, a head portion on said drills in engagement with said cams on the inoperative stroke of their reciprocal movement, a resilient member connected to each of said group of drills arranged to move each of said drills on the operative rock drilling stroke of its resilient movement, means including gearing connected to said motor for rotating said cams, and means connected to said motor and independent of said cams for revolubly rotating said wheeled frame.

16. In a rotary tunneling machine, the combination with a rotary rolling wheeled frame, adapted to rollingly feed forward and backward in a circular tunnel, said frame comprising disk-shaped flanges mounted on a center driving shaft and secured together to rotate with said shaft in unison, and having apertures adapted to permit an operator to pass from one end of said frame to its opposite end along said driving shaft, a plurality of foot tread wheels mounted at predetermined distances apart throughout the circumference of the said disk flanges, means connected to said disk flanges including pivotal journal bearings for adjusting the radial distance of each pair of foot tread wheels relative to the axial center of said driving shaft and for pivotally swinging and adjusting said tread wheels to cause said wheels and frame to move longitudinally in a tunnel in spiral planes when rotated, a plurality of reciprocating stems journaled in said frames parallel with said driving shaft, an adjustable collar on each stem between said disk flanges, a coiled expansion spring on each stem between said collar and the rear flange of said disk, a coiled compression spring loosely mounted between said collar and the front end disk of said frame, a cam drum mounted on said driving shaft, a plurality of cams mounted on said cam drum, an electric motor suspended from said driving shaft, a gear on said cam drum connected to said motor, a circular head portion on the rear end of each of said stems adapted to engage and roll on said cams and impart a rolling motion to said stems, a disk-shaped cutter head mounted on the front end of each of said stems provided with a plurality of rock cutting lips arranged in any predetermined order, said cutter heads being positioned to cut a circular shaped tunnel slightly larger in diameter than said frame, and means including gearing connected to said motor for rotatably rolling said frame and cutter heads and stems on the floor of said tunnel.

17. In a rotary tunneling machine, the combination with a rotary tread wheel frame and a center driving shaft, of a cam-drum rotatably mounted on said driving shaft, a motor, a sun and planet gearing connected with said motor, and driving shaft, means connecting said cam-drum and motor, connections between the motor and said cam-drum and driving shaft causing them to run at differential rates of speed.

18. In a rotary tunneling machine, the combination with a rotating adjustable tread foot wheel frame and a driving shaft, of a plurality of drill stems rotatably and reciprocally journaled in said foot wheel frame, a cam-drum rotatably mounted on said driving shaft independent of the rotative movement of said frame, comprising a drum shaped casting, a pair of wedge shaped cams on the outside surface of said drum, and a pair of cams on the inside of said drum, an enlarged circular shoulder portion on each stem arranged to be engaged by said cams, and to be rotated by the rotary movement of said cams; said cams being arranged and adapted to engage said shouldered portions of said stems and move said stems on the rearward stroke of their reciprocal movement and at the same time to impart to them a rotary movement, a coiled expansion spring arranged on each stem to actuate said stems on the rock striking stroke of their reciprocal movement, means connected to said frame for cushioning the spent striking strokes of said stem, and a suitable rock drilling cutter head removably secured to each of said stems.

19. In a rotary tunneling machine, the combination with a driving shaft, a revoluble frame comprising a pair of flanges positioned apart and connected by rods, said flanges having a plurality of tread foot wheels at their peripheral surfaces, of a circumferential row of cutter head supporting stems rotatably and reciprocally journaled in said frame in a position to drill a circular tunnel of larger diameter than said frame, and cutter head supporting stems within the circular row of stems, each of said stems being arranged to be independently rotated in its journal bearings, and said stems being collectively mounted revoluble with said frame and its driving shaft, means connected to said driving shaft and said frame and including a motor and cams for independently rotating said stems and for moving them on the inoperative stroke of their reciprocal movement, means connected to said motor and connected to said driving shaft and frame for rotating said frame independently and at a predetermined differential rate of speed from said rotary movement of said cams, said stems being arranged to project beyond the front end of said frame, a cutter head supporting disk removably secured to each stem, a cutter head comprising a disk shaped head containing a plurality of rock cutting lips removably secured to the supporting disk of each stem, an adjustable collar on each stem, a coiled expansive spring mounted on each stem between one side of said collar and said frame and arranged to impinge said cutter heads and stems on the rock cutting stroke of their reciprocal movement, and a coiled contraction spring on each stem between the opposite side of said collar and said frame arranged to cushion said stems on their forward spent blows.

20. In a rotary tunneling machine, the combination of a driving shaft, a tread wheel frame, and a motor, of a circumferential row of reciprocating drills rotatably and reciprocally mounted on said frame, a pair of reciprocating and rotatable drills mounted within said circumferential row of drills and arranged one on each side of said driving shaft, said drills rotating collectively with said frame and driving shaft and to drill a circumferential tunnel of larger diameter than said rotating tread wheel frame, and means connected with said drills including springs for reciprocating said drills to operatively drill into and cut away the breast of a rock tunnel as they rotate with said frame.

21. In a rotary tunneling machine, the combination of a rotating frame, a driving shaft and a motor connected to said frame, with a group of cutter head disks and stems journaled rotatably and reciprocally in said frame, each of which is adapted to be rotated and also to be reciprocated, said cutter head disks and stems being adapted to rotate collectively with said tread foot frame, and to drill a circular tunnel as they collectively rotate together with said frame of larger diameter than said frame, a cam-drum rotatably mounted on said driving shaft provided with cams adapted to move said stems and cutter heads on the backward stroke of their reciprocal movement, said cams having their operative cam surfaces beveled, enlarged circular portions on each of said stems having a shoulder beveled to register with and adapted to engage said beveled cam surfaces, said beveled registering surfaces of said cams and stem rotating said stems as said rotating cams engage them and move them on their backward stroke to impart to said stems and cutter heads a continuous rotary movement after they leave said cams and are thrown forward on their operative rock drilling strokes, whereby said stems and cutter heads spirally rotate on their reciprocating strokes, means including gearing connected to said motor and cam-drum for rotating said cam-drum independently of said frame, springs arranged to impinge said stems and cutter head forward on their rock cutting strokes, and a plurality of rock cutting lips on said cutter head disks.

22. In a rotary tunneling machine, the combination with a driving shaft, a rotating frame, a cam-drum and a motor, a group of drill stems rotatably and reciprocally mounted in said frame, an adjustable abutment collar, an expansive stem actuating spring, and cushioning springs on said stems, of a rock cutting cutter head mounted on each of said stems and positioned to drill a circular tunnel, said cutter heads comprising a disk provided with a plurality of wedge or V shaped lips arranged in groups on the face of each cutter head, each group occupying a predetermined section of the face of each cutter head, and the rock cutting lips of each group being arranged parallel to each other.

23. In a rotary tunneling machine, the combination with the rotary tread foot wheel frame, the center driving shaft, the drill stems rotatably and reciprocally mounted in said frame, and a cutter head supporting hub on the forward end of each of said stems, of a cutter head comprising a disk provided with a plurality of rock cutting lips of the form of a triangle in cross section, each lip being provided with a perpendicular side and having its cutting edges at the junction of said perpendicular side and the adjacent edge of the top of each lip.

24. In a rotary tunneling machine, the combination of the frame, a plurality of stems reciprocally mounted on said frame, and a cutterhead supporting hub on each of said stems, with a cutter head comprising a plurality of triangular-shaped rock cutting lips having flat top ends and a perpendicular side substantially at right angles to said flat top ends, and having the rock cutting edge of their lips at the junction of said perpendicular side and said flat top edge of said lips.

25. In a rotary tunneling machine, the combination of a frame, a plurality of reciprocating stems mounted on said frame, a cutterhead supporting hub on each of said stems, with a cutter head provided with a plurality of rock cutting flat top triangular-shaped edges or lips, said lips or edges being arranged in groups on each quarter angle of the rock cutting surface of said head, said teeth being arranged parallel to each other on each quarter angle of the face surface of and parallel with the diametrical center of said cutter head, and means for detachably securing said cutter head to said supporting hub of said stems.

26. In a rotary tunneling machine, the combination of a frame, a plurality of reciprocating stems mounted on said frame and a cutterhead supporting hub on each of said stems, with a cutter head provided with a plurality of rock cutting flat top triangular-shaped edges or lips, said lips or edges being positioned in groups on each quarter angle of the rock cutting surface of said head, said teeth being arranged parallel to each other on each quarter angle of the face surface of and parallel with the diametrical center of said cutter head, and means for detachably securing said cutter head to said supporting hub of said stems.

27. In a tunneling machine, the combination with a rotary frame, having a driving shaft and supporting wheels, a motor attached to said driving shaft, and means including gearing operated by said motor, for driving said shaft and frame, of cutters arranged to slide longitudinally in said frame, a rotary cam for withdrawing said cutters, springs for throwing said cutters when they escape the cams, a gear wheel connected to said cams, and means including gears connected to said motor for rotating said cams and frame independently, and at different rates of speed, axially-adjustable blocks provided on each end of the frame, to which the wheels are attached; arms projecting from a pair of oppositely positioned axially-adjustable blocks, follower blocks having recesses in which the free ends of said arms extend, a rod journaled in said frame to which said follower blocks are threaded, a hand wheel on the end of said rod, whereby said rod may be turned to move the follower blocks, and thereby turn the wheels at an angle to the axis of the machine, and means for adjusting the wheel-supporting blocks radially.

28. In a rotary tunneling machine, the combination with a revolving frame, of a cutter head, comprising a disk, a stem mounted in said frame and supporting said disk, means including a motor for rotating said frame and for revolubly rotating said stem and disk around the axis of said frame, said disk being provided with a plurality of rock cutting lips on its face and a plurality of rock cutting lips on its peripheral surface.

29. In a rotary tunneling machine, the combination with a rotary moving and feeding frame, of a plurality of reciprocating and rotating cutter heads arranged in a circle in said frame and adapted to rotate with it, each of said cutter heads comprising a disk provided with rock cutting lips on its end arranged in groups on each quarter angle of its end surface.

In testimony whereof I affix my signature in presence of two witnesses.

RUSSEL B. SIGAFOOS.

Witnesses:
G. SARGENT ELLIOTT,
FRANK M. KEISER.